United States Patent
Barnett

(10) Patent No.: US 12,417,509 B2
(45) Date of Patent: Sep. 16, 2025

(54) SYSTEM AND METHOD OF CONTROLLING EQUIPMENT BASED ON DATA TRANSFERRED IN-BAND IN VIDEO VIA OPTICALLY ENCODED IMAGES

(71) Applicant: Michael Barnett, Pittsboro, NC (US)

(72) Inventor: Michael Barnett, Pittsboro, NC (US)

( * ) Notice: Subject to any disclaimer, the term of this patent is extended or adjusted under 35 U.S.C. 154(b) by 369 days.

(21) Appl. No.: 18/082,828

(22) Filed: Dec. 16, 2022

(65) Prior Publication Data
US 2023/0119262 A1 Apr. 20, 2023

Related U.S. Application Data

(63) Continuation of application No. 16/374,404, filed on Apr. 3, 2019, now Pat. No. 11,557,015, which is a continuation of application No. 16/020,372, filed on Jun. 27, 2018, now abandoned.

(60) Provisional application No. 62/634,176, filed on Feb. 22, 2018.

(51) Int. Cl.
| | |
|---|---|
| *G06K 9/00* | (2022.01) |
| *G06T 1/00* | (2006.01) |
| *H04N 19/40* | (2014.01) |
| *H04N 19/467* | (2014.01) |
| *H04N 21/235* | (2011.01) |

(52) U.S. Cl.
CPC ......... *G06T 1/0021* (2013.01); *G06T 1/0085* (2013.01); *H04N 19/40* (2014.11); *H04N 19/467* (2014.11); *H04N 21/235* (2013.01); *G06T 2201/0051* (2013.01); *G06T 2201/0083* (2013.01)

(58) Field of Classification Search
None
See application file for complete search history.

(56) References Cited

U.S. PATENT DOCUMENTS

| | | | |
|---|---|---|---|
| 5,809,139 | A | 9/1998 | Girod et al. |
| 6,058,238 | A | 5/2000 | Ng |
| 6,370,272 | B1 | 4/2002 | Shimizu |
| 6,850,252 | B1 | 2/2005 | Hoffberg |
| 8,443,407 | B2 | 5/2013 | Gaede et al. |
| 8,511,540 | B2 | 8/2013 | Anguiano |
| 8,553,146 | B2 | 10/2013 | Kennedy |
| 8,833,640 | B2 | 9/2014 | Martch et al. |

(Continued)

*Primary Examiner* — Wei Wen Yang
(74) *Attorney, Agent, or Firm* — COATS & BENNETT, PLLC

(57) ABSTRACT

Data is encoded into one or more optically encoded images. The optically encoded images are then inserted as image data into a video sequence—i.e., in video frames. Data are transmitted in-band within the video, via any conceivable video distribution channel or format. The video may be trans-coded as required—because the data are optically encoded, any video processing that even crudely preserves the frame images will preserve the optically encoded data. This scheme of in-band data transfer in video is very robust. A video receiving apparatus receives the video, inspects the image data from video frames in memory, detects optically encoded images in the image data, and decodes the optically encoded images to recover the data. The frames carrying optically encoded images are typically discarded and not rendered to a display. The receiver controls connected equipment, other than a display (e.g., a musical instrument), based on the extracted data.

15 Claims, 7 Drawing Sheets

(56) References Cited

U.S. PATENT DOCUMENTS

| | | |
|---|---|---|
| 9,367,669 B2 | 6/2016 | Gratton |
| 9,571,888 B2 | 2/2017 | Casagrande et al. |
| 9,736,469 B2 | 8/2017 | Schaefer et al. |
| 2005/0097361 A1 | 5/2005 | Apostolopoulos et al. |
| 2007/0087756 A1 | 4/2007 | Hoffberg |
| 2011/0129116 A1 | 6/2011 | Thorwirth |
| 2012/0222055 A1 | 8/2012 | Schaefer et al. |
| 2015/0227922 A1 | 8/2015 | Filler |
| 2019/0132413 A1* | 5/2019 | Don ................ H04N 21/44209 |
| 2019/0259124 A1 | 8/2019 | Barnett |

* cited by examiner

SYSTEM AND METHOD OF CONTROLLING EQUIPMENT BASED ON DATA TRANSFERRED IN-BAND IN VIDEO VIA OPTICALLY ENCODED IMAGES

CROSS-REFERENCE TO RELATED APPLICATIONS

This application is a continuation of U.S. patent application Ser. No. 16/374,404, filed Apr. 3, 2019, which is a continuation of U.S. patent application Ser. No. 16/020,372, filed Jun. 27, 2018, which is a non-provisional patent application claiming the benefit of U.S. Provisional Patent Application Ser. No. 62/634,176, filed Feb. 22, 2018-all of which are hereby incorporated by reference in their entireties.

FIELD OF INVENTION

The present invention relates generally to remote control of equipment, and in particular to a system and method of controlling equipment via optically encoded data transmitted as in-band video.

BACKGROUND

Between the vast reach of the Internet and the near-ubiquity of cellular telecommunications, more data is transmitted, shared, downloaded, and in general transferred from one place to another than at any time in history. Yet much data transfer remains inconvenient, subject to errors, and suboptimal. For example, while numerous facilities and applications enable tele-learning to an unprecedented degree, the data transfer required for a typical course remains fragmented and inconvenient. Class lectures may be viewed as video on numerous devices, via numerous channels (e.g., YouTube® video streaming service), but course material, such as course text, notes, images, and the like, must be separately downloaded. As another example, a popular distribution system for Musical Instrument Digital Interface (MIDI) files, which allow some musical instruments to play back recorded performances, utilizes one channel of standard stereo audio transfer for the MIDI data; this obviously destroys the stereo aspect of the audio.

Small, inexpensive, high-resolution cameras; increasing telecommunications and networking bandwidth; and sophisticated encoding algorithms which dramatically reduce video signal data size, have combined to make the acquisition and distribution of high-resolution video commonplace. Most smartphones include a camera—as do drones, automobiles, traffic control devices, and surveillance cameras—not to mention video cameras. Terabytes of video are up/down-loaded and transferred daily. The vast majority of video comprises a sequence of images (in consecutive frames) and continuous audio. A video receiver inputs either an analog video signal (e.g., NTSC, PAL) or a digital representation of encoded video (e.g., MPEG-4, H.264, etc.), and decodes and synchronizes the video signal. Image data from within each frame are extracted and written to a frame buffer, and graphics circuits render the image data in the frame buffer to a display. Audio signals are similarly decoded and rendered by audio circuits to speakers.

It is known in the art to transfer some limited types of data within a video signal, such as closed-captioning or Secondary Audio Programming (SAP). These data are typically encoded in a part of the video signal that does not carry image data-such as line 21 of the vertical blanking interval. As used herein, a "frame" of video refers to each portion of the video sequence or signal that carries image data, and excludes portions of the video sequence or signal, such as blanking intervals, that do not carry image data.

It is known to encode data into visual codes that may be optically read by machines, such as Universal Product Codes (UPC), a type of one-dimensional bar code. Two-dimensional optical codes are also known, such as the Quick Response (QR) code. A typical application of QR codes is to encode advertising data, such as the Uniform Resource Locator (URL) of an Internet website, and print them on product packaging or print advertising. Consumers "read" the QR code using the camera of a smartphone, and an "app" decodes the data, opens a browser, and directs it to the encoded URL. A similar use of QR codes known in the art is for a video player to generate and embed a QR code in one or more frames of video, prior to sending its graphical output to a display. Users can optically "read" the QR code in the displayed video, e.g., via a smartphone camera. In this manner, the video player may send limited data to the user's smartphone, such as a URL to a website having installation or troubleshooting information, or billing information. These codes must be optically read from the display, using a camera.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments of the present invention described and claimed herein, arbitrary data are encoded into one or more optically encoded images. The optically encoded images are then inserted as image data into the video—i.e., in video frames. Data are thus transmitted in-band within the video, via any conceivable video distribution channel or format, such as YouTube®, Short Messaging Service (SMS, or "texting"), as a file transmitted as part of a website or by a file transfer protocol (FTP), on a disk or memory card, or the like. The video may be trans-coded essentially an unlimited number of times—because the data are optically encoded, any video processing that even crudely preserves the frame images will preserve the optically encoded data. This scheme of in-band data transfer in video is thus extremely robust. A video receiving apparatus receives the video (in any of a vast number of formats), inspects the image data from video frames in memory, detects optically encoded images in the image data, and decodes the optically encoded images to recover the data. The frames carrying optically encoded images are typically discarded and not rendered to a display (although in some cases they may be rendered along with other image frames). The data from a plurality of optically encoded images may be concatenated, and further processed.

One embodiment relates to an apparatus for controlling equipment. The apparatus includes a receiver configured to non-optically receive a video sequence; an optically encoded image decoder configured to detect one or more images of optically encoded data in an image portion of one or more video frames and decode each detected image of optically encoded data to extract the data. The apparatus is configured to control equipment, other than a display, connected to the apparatus based on the extracted data.

Another embodiment relates to a method of controlling equipment. A video sequence is non-optically received. One or more images of optically encoded data is detected in an image portion of one or more video frames of the video sequence. Each detected image of optically encoded data is decoded to extract the data. Equipment, other than a display, connected to the apparatus is controlled based on the extracted data.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Optical Encoding of Data

Figure 1:
FIG. 1 depicts a one-dimensional bar code.
Figure 2:
FIG. 2 depicts a two-dimensional bar code.

FIG. 1 depicts a well-known one-dimensional bar code, in this case a Universal Product Code (UPC-A) format. The UPC-A bar code can uniquely encode 12 numerical digits in an optically-readable sequence of black bars and white spaces. FIG. 2 depicts a two-dimensional optical code, often referred to as a 2-D bar code or matrix code. In this case, the matrix code is a Quick Response (QR) code. QR codes offer flexibility in terms of the mode (type of data encoded, e.g., numeric, alphanumeric, binary), the version (indicating the dimensions of the symbol) and error correction level. As an example, a typical QR code can encode 2,148 bytes of data.

Figure 3A:
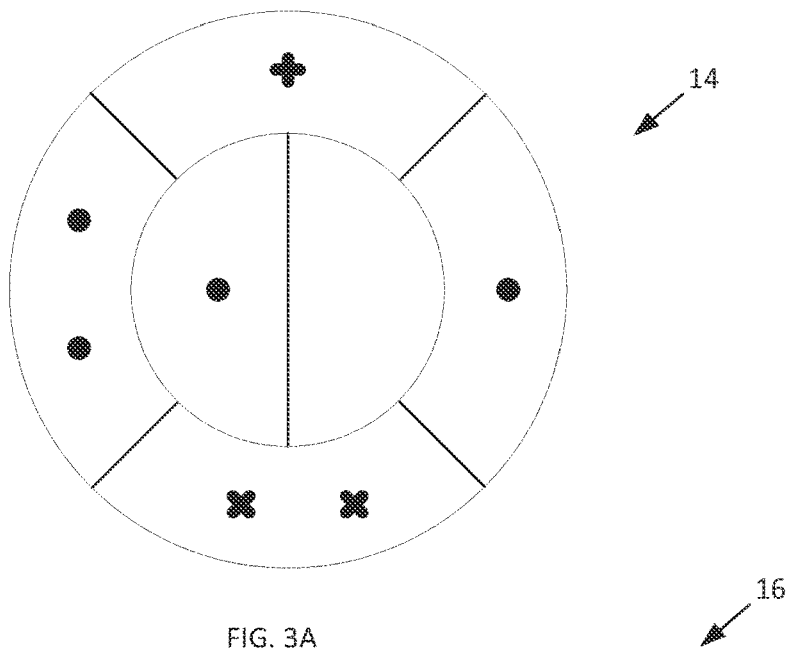
FIGS. 3A, 3B, and 3C depict variations on the same data encoded in an artistic optical code.
Figure 3B:
Figure 3C:
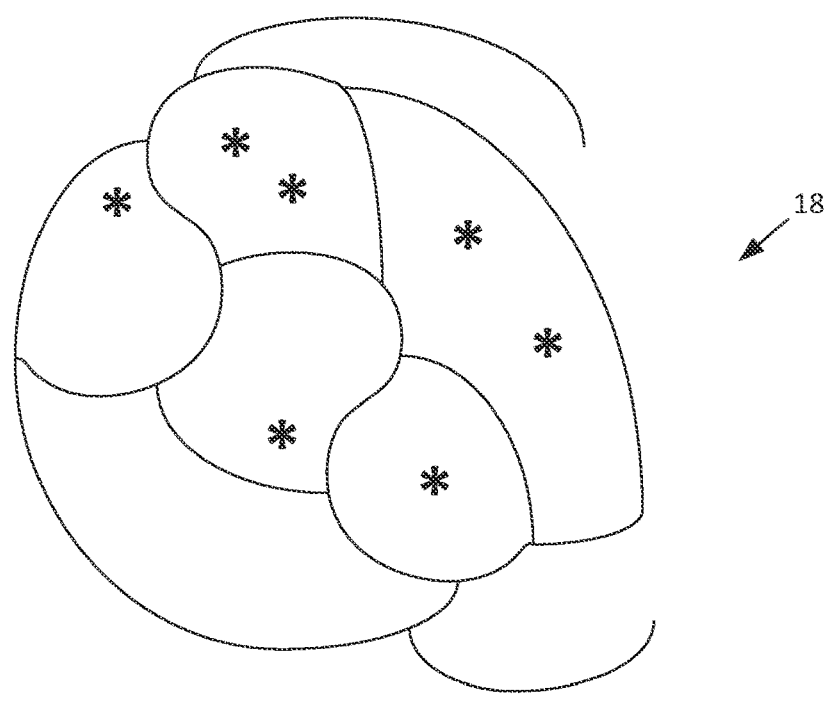

FIGS. 3A, 3B, and 3C are representative examples of another type of optical data encoding-all three of these images encode the same data. Sometimes referred to in the art as asthetic codes, or artcodes, these optically readable images uniquely map the number of enclosed spaces, and the number of objects contained in each space, to data. In the embodiment depicted, the shape of the objects is irrelevant. In FIG. 3A, there are six enclosed spaces. Two of these spaces contain two objects (dots and x's); three of the spaces contain one object (two dots and one +), and one space contains no objects. FIG. 3B, while strikingly different from FIG. 3A visually, also comprises six enclosed spaces, of which two spaces contain two objects, three spaces contain one object, and one space contains no objects. Similarly, FIG. 3C meets the same criteria. This type of code is flexible in the number of data combinations it can encoded, depending on the maximum number of enclosed spaces and the maximum number of objects defined. The code space may be easily enlarged by recognizing not only the number of objects in each enclosed space, but recognizing—and giving code mapping significance to—the type or shape of object detected.

One particular advantage of the class of optical encoding of data represented by FIGS. 3A, 3B, and 3C is that it is not readily recognized as such. That is, a matrix code such as a QR code is readily recognized-indeed, in most applications this is desirable, as it invites a user to capture the code using a camera (e.g., integrated with a smartphone) to capture the code for decoding and processing of the data (e.g., direct a browser to a URL). In contrast, the aesthetic codes may be artistically interwoven with graphics, and the fact that data is encoded is unrecognized by most people. Only if the graphic is optically captured, such as by a camera, and processed by software programmed or trained, in the case depicted, to recognize closed spaces and count enclosed objects, can the data be decoded and utilized.

FIGS. 1, 2, and 3A-B are presented to demonstrate the breath of possibilities in optically encoding data, and are not limiting. As used herein, the term "optically encoded image" refers to an image that encodes data in a manner that can be optically read and decoded by a machine, but not a human. For example, text (as well as characters of any written language normally read by humans), although it may be optically read and decoded by machine, does not fall within the definition of "optically encoded image," because it is read by humans. Conventionally, an optically encoded image is optically captured by a machine, such as scanned by a laser/detector, or captured by a camera. According to embodiments of the present invention, one or more optically encoded images are embedded in frames in a video sequence and transferred from a source to a video receiver that has the functionality of detecting and decoding the optically encoded images from frames of the video sequence. Similarly, as used herein, "optically encoded data" refers to data that has been encoded into an optically encoded image. These phrases are to be broadly construed, and cover all standards and protocols for machine-readably, optically encoding data, whether published or not, and indeed whether currently known or yet to be defined.

Embedding Optically Encoded Data in Video

Figure 4:
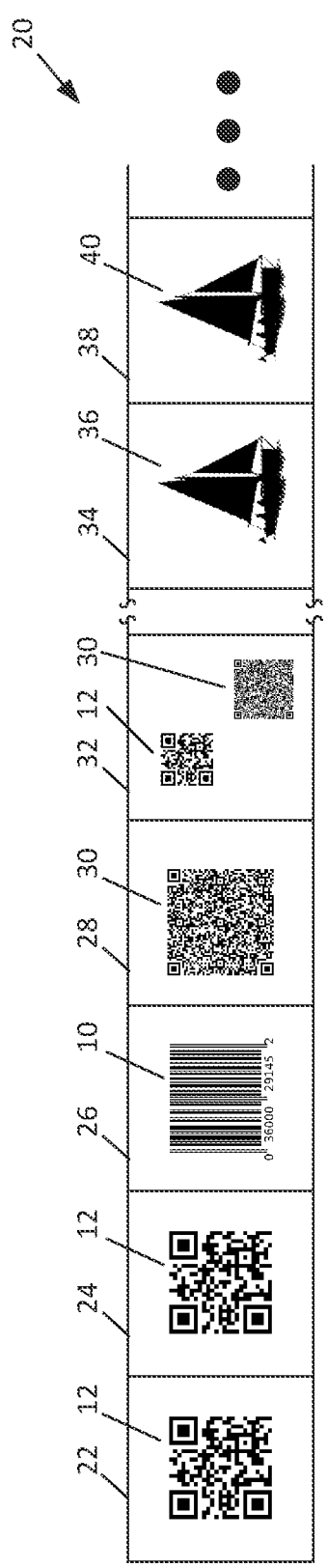
FIG. 4 depicts image frames of a video sequence, with optically encoded images embedded in video image frames at the beginning of the video sequence.

According to embodiments of the present invention, one or more optically encoded images is inserted, or embedded, as an image in a frame of a video sequence. This may be done in a variety of ways. FIG. 4 depicts a plurality of optically encoded images 10, 12, 30 inserted together into successive frames 22-32 at the front of a video sequence 20, with frames 34, 38 comprising the intended visual content 36, 40 of the video following. In particular, the first frame 22 of the video sequence 20 includes optically encoded image 12 (in this case, a QR code, as depicted in FIG. 2), which uniquely encodes at least a first portion of some data, which in general may be unrelated to the content of the video sequence 20. The second frame 24 includes, in this embodiment, the same optically encoded image 12. Repetition of optically encoded images 12 in the video sequence 20 is one way to make the in-band transmission of data within a video stream 20 more robust (while reducing its bandwidth), in addition to, e.g., error correction coding within the encoding algorithm of the optically encoded image 12.

Video frame 26 includes an optically encoded image 10 (in this case, a UPC-A one-dimensional bar code, as depicted in FIG. 1). Frame 28 includes an optically encoded image 30 that, in this embodiment, is a QR code encoded according to a different format than optically encoded image 12. For example, optically encoded image 12 may be a Version 3 QR code, while optically encoded image 30 may be a Version 10 QR code.

In general, there is no limitation on the mixing of encoding protocols, modes, versions, or even types of optical codes employed in embodiments of the present invention. In any particular embodiment, one of skill in the art is likely to select, and consistently use, a particular optical encoding protocol based on technical considerations (e.g., the amount of data to be transferred and the code density of various optical encoding protocols; the number of video frame available for carrying optically encoded images, if limited; the level of error correction coding desired or required; the processing speed, memory, and/or sophistication of software in a video decoder compared to the complexity of the image decoding task; and the like). However, homogeneity of encoding type, protocol, version, ECC level, etc., is not required, and is not a limitation of embodiments of the present invention.

Referring again to FIG. 4, video frame 32 includes two different optically encoded images 12 and 30—effectively at least doubling the data transmission bandwidth of the video sequence 20. There is no requirement, according to embodiments of the present invention, that each video frame 22, 24, 26, 28, 32 include only one optically encoded image 10, 12, 30. Indeed, the number of optically encoded images 10, 12, 30 that may be placed in one video frame 22, 24, 26, 28, 32 is limited only by the resolution of the selected video format and the capabilities of a suitable video receiving apparatus.

After any number of video frames 22, 24, 26, 28, 32 carrying optically encoded images 10, 12, 30, the conventional video content begins at frame 34, with conventional video image 36. The following video frame 38 usually carries a very slightly different image 40, and so on, as well known in the video art. This arrangement of data transmission in-band in video via optically encoded images 10, 12, 30—with the optically encoded images 10, 12, 30 placed at the front of the video sequence 20—may be useful where the data transfer is desired to occur before the video playback. For example, in a distance learning application, the in-band, optically encoded data may comprise lecture notes, example problems, images, etc., related to the subject, and the video content comprises a professor's lecture. In this case, it would be advantageous to transmit the supporting text and image material "up front," so that a student may refer to it (e.g., in a window of a computer or other playback device other than the video playback window) while watching the lecture.

In other use cases—particularly where legacy video players are anticipated, which cannot recognize and remove optically encoded images 10, 12, 13—it may be advantageous to transfer the data following the video sequence. For example, a movie trailer may embed a small video game related to the movie into the trailer. The data—in this case an executable file, or code such as Javascript—is encoded into optically encoded images 10, 12, 13, which must be embedded into the video sequence comprising the movie trailer. Users having a video receiving apparatus or player that is capable of recognizing and extracting the optically encoded images 10, 12, 30 will be able to play the game—either on the video receiving apparatus or another device, such as a laptop or tablet computer, gaming console, or the like. These users will not see the optically encoded images 10, 12, 30, as their video receiving apparatus will suppress them from being rendered to a display. However, users viewing the trailer on a legacy video receiving apparatus, which does not recognize the optically encoded images 10, 12, 13, will not be able to play the game, and furthermore they will see these optically encoded images 10, 12, 30 rendered to the display. Such display may be distracting; users may even believe there is some error. In this case, the sequence of optically encoded images 10, 12, 30 is best embedded into the video sequence at the end, so that they will display to the screen of legacy players only after the video content frames have been rendered—that is, after the movie trailer has played. This implementation may be readily visualized as a "mirror image" of FIG. 4—the conventional video image frames are transmitted first, and frames containing optically encoded images (employing any or all of the mixing and variations depicted in FIG. 4 and described above) are at the end of the video sequence.

Figure 5:
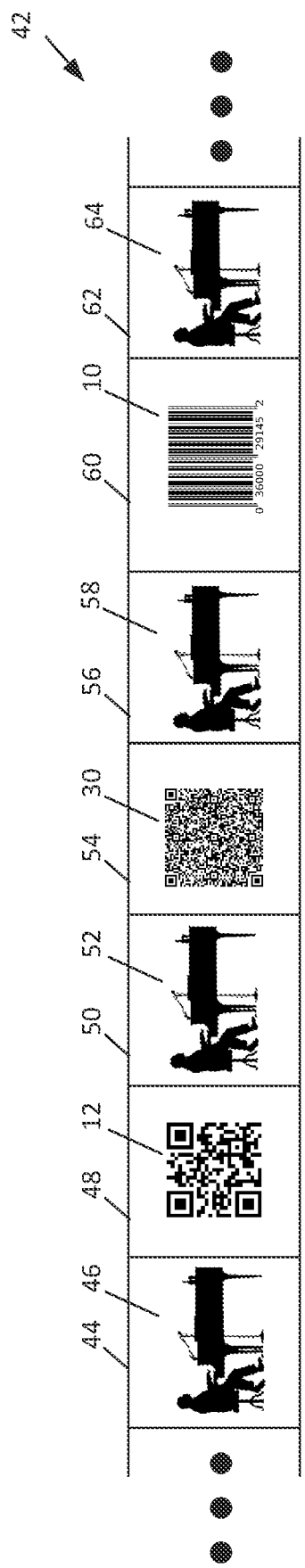
FIG. 5 depicts image frames of a video sequence, with optically encoded images embedded in video image frames interspersed with video image frames in the video sequence.

FIG. 5 depicts a portion of a video sequence 42 in which video frames containing optically encoded images are interspersed with video frames containing the video content images. This may be useful where the data transfer is related to, and indeed keeps pace with, the video playback. For example, as mentioned above, MIDI files allow appropriately configured musical instruments to actually play prerecorded performances. As one representative use case, a piano performance artist may play a concert, in which both the artist is recorded by one or more video cameras, and his or her performance—the sequence, timing, force, etc. with which he or she strikes the keys—is recorded by MIDI recording equipment installed in the piano. When a video of the concert is conventionally produced, the MIDI data may be transmitted in-band in the video by segmenting the data, optically encoding each segment into an optically encoded image, and interspersing the optically encoded images with the video content image frames prior to distributing the video. Upon playback, a user with a MIDI-equipped piano could play the video with the piano sound muted, and output MIDI commands from an appropriately equipped and programmed player to his or her piano.

Such a video receiving apparatus (as described further herein), may recognize optically encoded images, decode them to extract segments of the MIDI data, suppress the frames carrying the optically encoded images from the video playback (so as to not detract from the visual playback), process the MIDI data (e.g., synchronizing it to the video), and output the MIDI data to a piano. In effect, the artist depicted in the video would be "playing" the user's own piano. In this case, the MIDI data could have been "front loaded" in the video sequence 20, as depicted in FIG. 4, and played out in sync with the video; however, pacing the MIDI data along with the video content image frames minimizes storage required in the video receiving apparatus, and may ease the task of synchronization with the video.

As depicted in FIG. 5, the video sequence 42 includes video content image frames 44, 50, 56, 62, containing (usually) slightly differing images 46, 52, 58, 64, which comprise the video content. Interspersed among the video content image frames 44, 50, 56, 62 are video frames 48, 54, 60 containing optically encoded images 12, 30, 10, respectively. Although depicted in FIG. 5 as alternating frames, this is not a limitation. In general, any number of video content image frames 44, 50, 56, 62 may be arranged consecutively, with one or more optically encoded image frames 48, 54, 60 inserted between such groups of consecutive video content image frames 44, 50, 56, 62.

As discussed above, the video frames containing optically encoded images will typically be suppressed from the display signal output by an appropriately configured video receiving apparatus, so as not to detract from the video content. However, in some cases, such selective frame suppression may not be possible, such as where a preprocessing circuit "snoops" incoming video to detect and decode optically encoded images, but cannot remove the corresponding frames from the video sequence. In other cases, a video sequence may be restricted to a specific length, and it is not possible to add to the frame count by inserting video frames containing optically encoded images. Accordingly, in one embodiment, optically encoded images are composited into a video sequence by varying local values of some visual aspect of the video content image frames, according to a pattern corresponding to the optically encoded image. For example, the intensity or hue of pixels falling with a black zone of an optically encoded image is decreased, and the corresponding visual aspect of pixels falling with the white zones of the optically encoded image is increased. This pattern may be repeated (or reversed) over several frames. Software examining digital representations of the video content image frames can detect these variations, extract therefrom the optically encoded image, and proceed to decode the optically encoded image to recover data.

In some embodiments, this compositing of an optically encoded image with video content images may be done using significant variations of the visual aspects of the images, and the results are perceptible by humans when the video is rendered to a display. In other embodiments, an optically encoded image is composited with video content images using only slight or subtle variations of the visual aspects of the images. In these embodiments, the optically encoded image may be overlaid on a plurality of video content image frames, to increase the reliability of detection. This comprises a form of steganography, wherein the optically encoded image can be detected and decoded by an appropriately configured video receiving apparatus, but the slight frame-to-frame variations in visual aspects of the video images are imperceptible to humans viewing a rendering of the video content.

Some compression algorithms-such as MPEG-n-compress video in part by replacing some image frames with motion vectors calculated on macro blocks of the frames' image data. Video containing in-band data transmission via optically encoded images may be processed with such formats simply by designating the optically encoded image frames as I-frames. If a video sequence is generated in an uncompressed format and later transcoded using a lossy compression algorithm, in general there will be sufficient differences between optically encoded images in successive frames that these frames would be interpreted as "scene changes," and be designated I-frames (or the functional equivalent in other formats). In the case of one or more optically encoded images being repeated frame-to-frame for robustness, compression may effectively eliminate the duplicate copies, but without loss of data recovery at the receiving apparatus. Hence, in general, in-band data transmission in video via optically encoded images, according to embodiments of the present invention, is robust to transcoding among various video codecs.

Video Player

Figure 6:
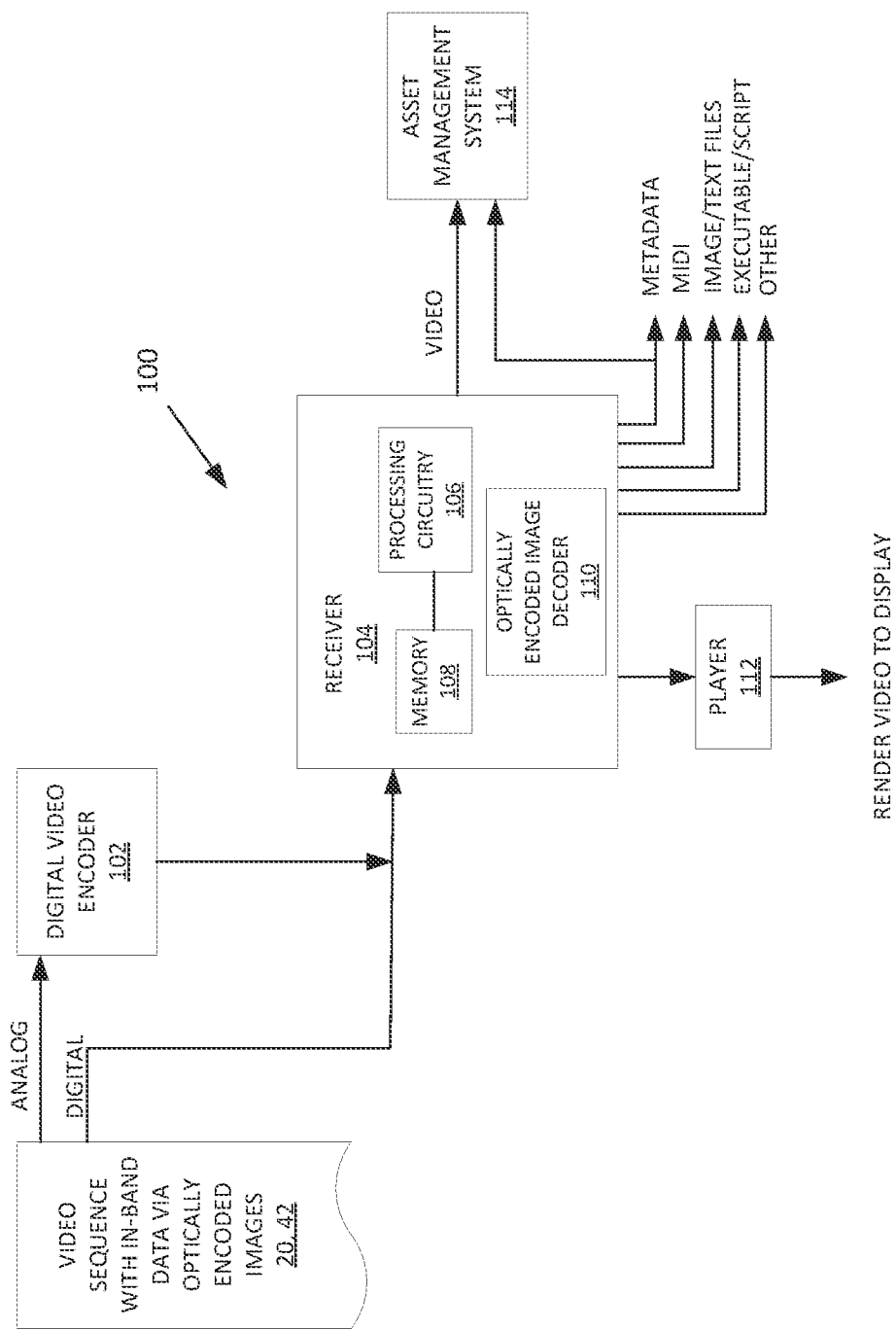
FIG. 6 is a block diagram of a video receiving apparatus configured to extract and decode data transmitted in-band in video via optically encoded images.

FIG. 6 depicts a video receiving apparatus 100. The video receiving apparatus 100 comprises a receiver 104 with an optically encoded image decoder 110, and may optionally include a digital video encoder 102 and a player 112. A video sequence, providing for in-band data transmission via optically encoded images, such as, e.g., video sequence 20 of FIG. 4 or video sequence 42 of FIG. 5, is obtained. Where the video receiving apparatus 100 is a computer, tablet device, smartphone, or the like, the video sequence 20, 42 may be obtained electronically, such as from the Internet (e.g., YouTube). Where the video receiving apparatus 100 is part of a home entertainment system, the video sequence 20, 42 may be received from a broadcast via cable, streaming, or over-the-air, or from a DVD or other video recording medium. Alternatively, the video sequence 20, 42 may be in the form of a digital file on any computer-readable media, such as a hard disc, Flash drive, or the like.

If the video sequence 20, 42 is in analog form (e.g., NTSC, PAL) a digital video encoder 102 encodes the analog video signal into a series of digital images, as well as processing the audio and any data embedded in non-frame portions of the signal, such as closed captioning or SAP (not shown). The output of the digital video encoder 102 may comprise bitmapped images, ready to be written to a video player 112 for rendering to a display. Alternatively, the digital video encoder 102 may output video frames in an encoded or compressed format (e.g., JPEG, PNG, etc.), which require further processing by the receiver 104 to yield bitmapped images suitable for the player 112. The encoder 102 may be embedded in the receiver 104. Alternatively, the video sequence 20, 42 may be in digital form (including encoded or compressed formats, such as MPEG), and input to the receiver 104 directly.

The receiver 104 may include a variety of codec functionality configured to decode video sequences in a variety of formats (e.g., MPEG, H.264, MOV, AVG, etc.), and generate digital representations of video image data in memory 108, whether bitmapped or in other formats. Processing circuitry 106 operatively connected to the memory 108 is configured to inspect and manipulate the digital image data in memory.

An optically encoded image decoder 110 is configured to detect optically encoded images in the digital representations of video image data in the memory 108, and is further configured to decode data from the optically encoded images. In one embodiment, the optically encoded image decoder 110 is implemented in hardware, such as an ASIC, programmable logic (e.g., FPGA), or full custom integrated circuitry. In other embodiments, the optically encoded image decoder 110 is implemented as one or more software modules executed by a processor, such as the processing circuitry 106 or a co-processor, such as a Graphics Processing Unit (GPU). In some embodiments, the optically encoded image decoder 110 may include Artificial Intelligence (AI) and/or Deep Learning technology, such as one or more neural networks. One such implementation is described in the paper, "Real-Time Barcode Detection and Classification Using Deep Learning" by Daniel Hansen, et al., published in Proceedings of the 9th International Joint Conference on Computational Intelligence, Vol. 1, pp. 321-27 (2017), which is incorporated herein by reference in its entirety.

In one embodiment, the optically encoded image decoder 110 initially determines a set of candidate frames, where optically encoded images are likely to be found. For example, the frames at the beginning and/or at the end of a video sequence may constitute candidate frames. Image data from at least the candidate frames is loaded into memory, and the optically encoded image decoder 110 inspects the image data to detect one or more optically encoded images. The video frame images may be loaded into memory sequentially or in any order. If no optically encoded images are detected in the candidate set of frames, then each frame of the video may be processed in turn (or in any order) to discover optically encoded images interspersed with video image frames. In some embodiments, the candidate set of frames may comprise all frames of the video—i.e., no preference is given to any set of frames in the search for optically encoded images.

In one embodiment the optically encoded image decoder 110 is further configured to extract, or omit, video frames including optically encoded images from the video sequence. The remaining video frames are then output to a player 112, which formats the video for display, such as to the screen of a smartphone or tablet computing device, via an HDMI interface to a video display, or by other means. The receiver 104 and player 112 additionally include audio processing circuits (not shown) configured to process and synchronize audio information in the video signal, and to output the audio.

The optically encoded image decoder 110 decodes optically encoded images in the video sequence 20, 42, to extract data therefrom. The data from consecutive optically encoded images may be concatenated to recover one or more larger data files (which data file was segmented to encode the segments into optically encoded images at the source). Alternatively, each optically encoded image may be independent, for example encoding separate commands or otherwise independent data. The processing circuitry 106, executing appropriate software modules (not shown) may further process the decoded data. It could, for example, assemble the data into image or text files, and output the files. The processing circuitry 106 may process the decoded data as MIDI commands, and output them to a musical instrument or other MIDI device. The processing circuitry 106 may assemble the data into an executable file and either execute it, or output the file for execution by another device. The processing circuitry 106 may assemble the data into a script or interpreted computer language (e.g., Java, FORTH), and either execute the script using an interpreter, or output the script to another device for execution. In general, there is no limitation to the data that may be transferred in-band in a video sequence via optically encoded images, or the uses to which the decoded data may be put by the video receiving apparatus 100. This data may be used by the processing circuitry 106 or formatted and output for use by a different entity.

In one embodiment, video sequences—either short "clips" or longer video, such as an entire movie—are output to an asset management system 114. The asset management system 114 may include a database storing video sequences, and/or an index storing video metadata. Metadata may include one or more of the name of the movie, its genre, its run time, the names of actors, the producers, reviews, and the like. In the case of video clips, other information about the video clip itself (e.g., a description of the screen, game/time/score/situation information in the case of plays in sporting events, etc.) may be embedded in the video clip itself, in the form of optically encoded images. According to embodiments of the present invention, such metadata may be embedded in the video in the form of one or more optically encoded images, as described herein. It is contemplated that "tagging" of movies with such metadata, encoded into one or more optically encoded images 4, will become a standard practice in the industry, and essentially all devices for the consumption of commercial video (e.g., Smart TVs, DVD players, set-top boxes that decode video signals broadcast by satellite or cable distribution, and the like) will include at least an optically encoded image decoder 110 capable of decoding and processing such metadata.

Methodology

Figure 7:
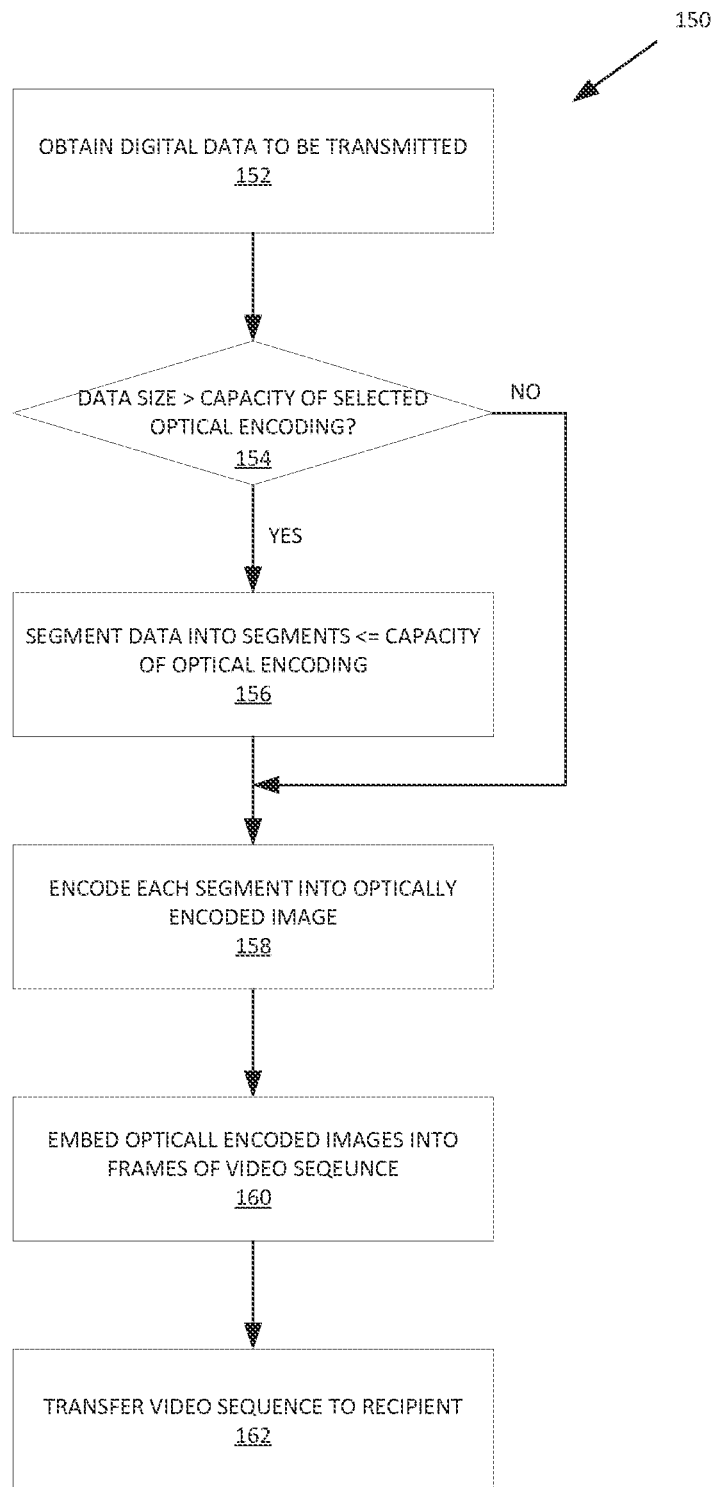
FIG. 7 is a flow diagram of a method of an efficient and robust method of transferring data in-band in a video sequence via optically encoded images.

FIG. 7 depicts the steps of an efficient and robust method 150 of transmitting data in-band in a video sequence via optically encoded images. Digital data to be transferred is obtained (block 152). The size of the data is compared to a predetermined size corresponding to the encoding capacity of a selected optical encoding scheme, considering the type and version of the encoding scheme, and the level of error correction coding desired or required. If the data size exceeds the encoding capacity (block 154), then the data is segmented into one or more segments, each of which is equal to or smaller than the predetermined size corresponding to the optical encoding capacity (block 156). Each segment of the data (if more than one) is optically encoded to form an optically encoded image (block 158). The optically encoded images are embedded in frames of the video sequence (block 160). As discussed above with reference to FIGS. 4 and 5, the optically encoded image frames may be positioned at the beginning or end of the video sequence, or may be interspersed with video image frames. The optically encoded images may be heterogeneous as to size, type, version, correction coding level, and the like. Each optically encoded image frame of the video sequence may include only one, or more than one optically encoded image. The video sequence—containing the data in-band as optically encoded images—is then transferred to a recipient. For example, the video may be uploaded to a video distribution service (e.g., YouTube), made available for download as a file, transferred as a file by a computer-readable medium (Flash drive, CD, DVD, etc.), or otherwise.

Figure 8:
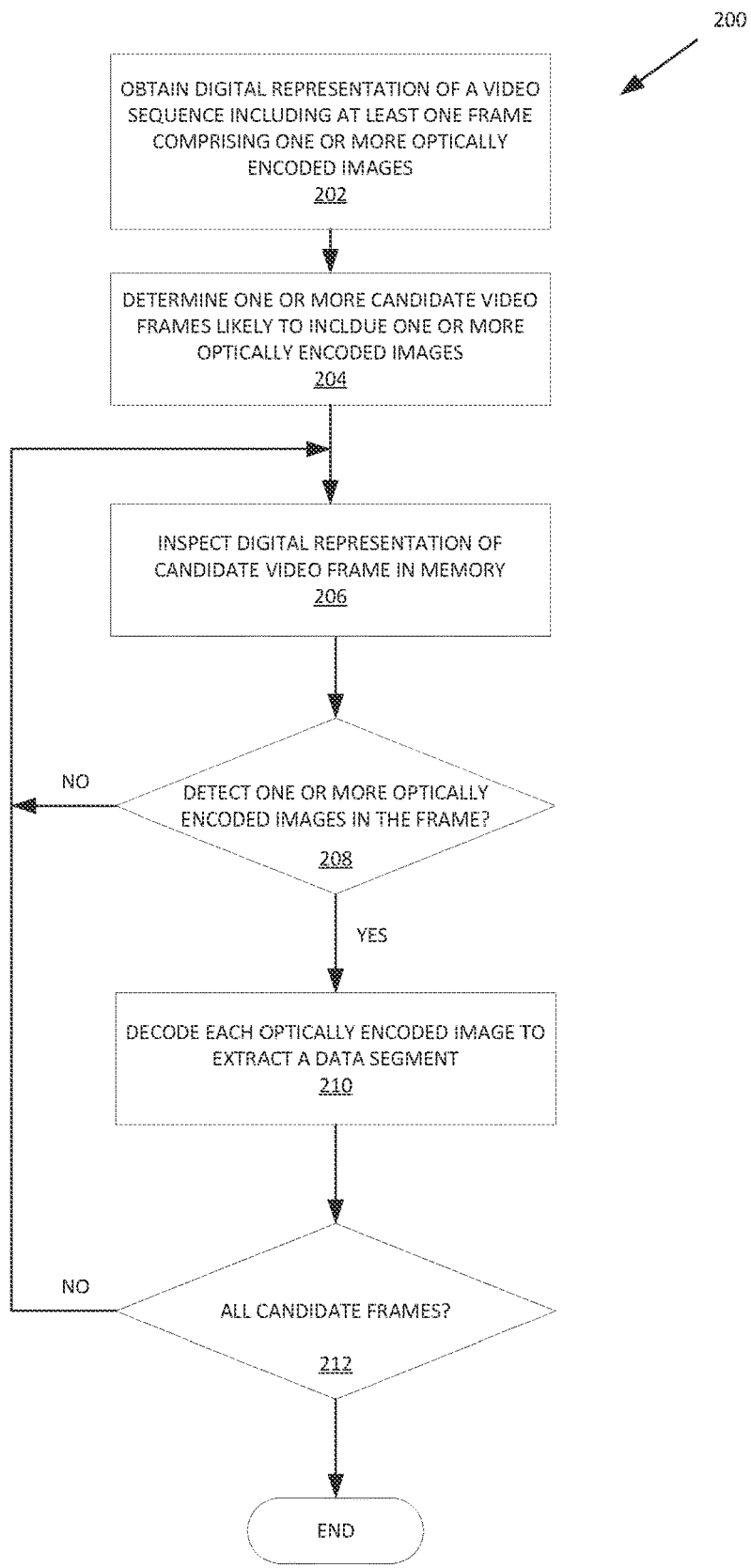
FIG. 8 is a flow diagram of a method of improving the operation of a video receiving apparatus by extracting data transferred in-band in a video sequence via optically encoded images.

FIG. 8 depicts the steps of a method 200 of improving the operation of a video receiving apparatus by extracting data transmitted in-band in a video sequence via optically encoded images. A digital representation of a video sequence, including at least one frame comprising one or more optically encoded images, is obtained (block 202). One or more candidate video frames likely to include one or more optically encoded images are determined (block 204). For at least each candidate video frame (block 210), a digital representation of the frame in memory is inspected (block 204). If one or more optically encoded images is detected in the frame (block 208), each optically encoded image is decoded to extract a data segment (block 210). If no optically encoded images are detected in the frame (block 208)—that is, if the frame contains a video image—then it is processed (e.g., passed to a frame buffer for display, or simply skipped over) and the next candidate video frame is stored in memory (block 206) and optically encoded images detected, if present (block 208). This process continues over all candidate frames in the video sequence (block 212). The method 200 may then be repeated, using a different criterion for determining candidate frames. For example, if no optically encoded images are found at the beginning or end of the video sequence, the set of candidate frames may be determined to be all video frames in the sequence (or all video frames other than those inspected in a previous iteration).

Figure 9:
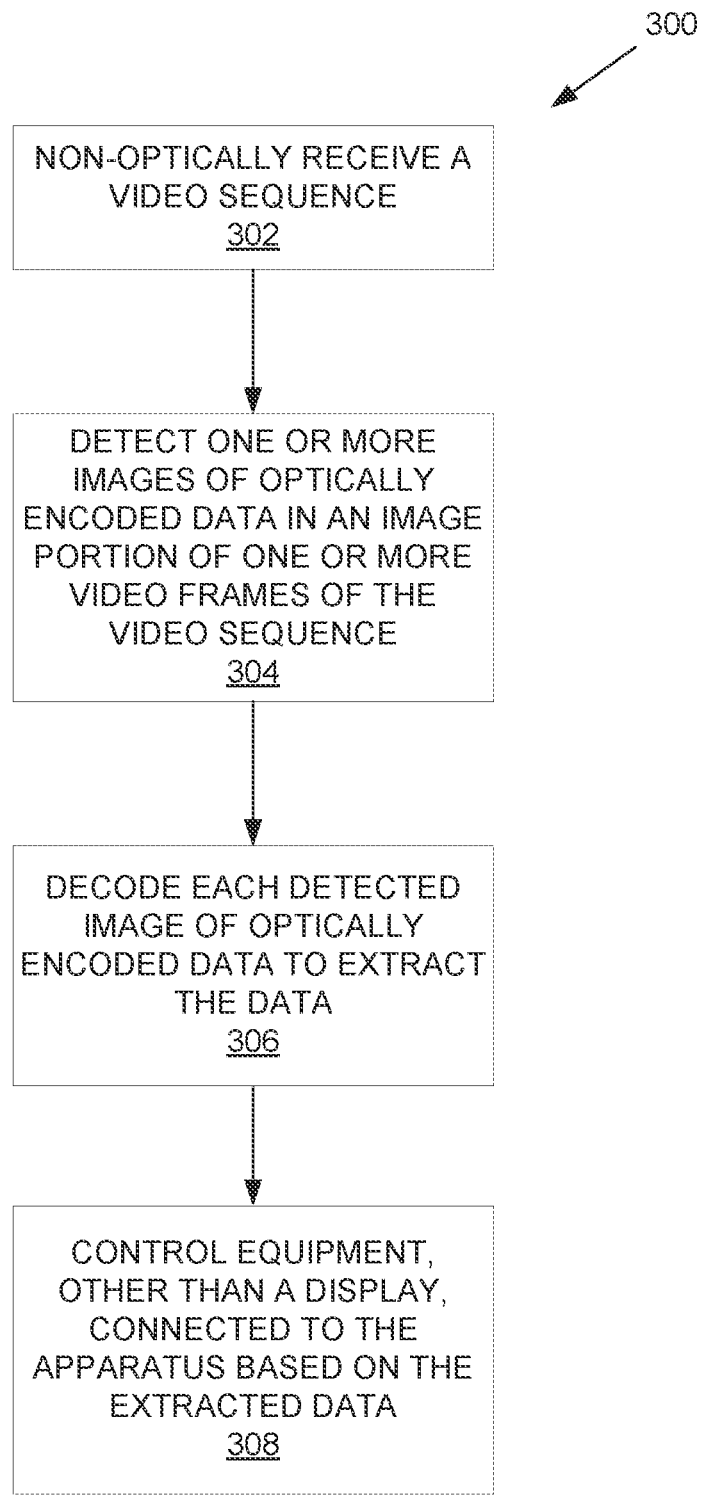
FIG. 9 is a flow diagram of a method of controlling equipment.

FIG. 9 depicts the steps in a method 300 of controlling equipment. A video sequence is non-optically received (block 302). One or more images of optically encoded data is detected in an image portion of one or more video frames of the video sequence (block 304). Each detected image of optically encoded data is decoded to extract the data (block 306). Equipment, other than a display, connected to the apparatus is controlled based on the extracted data (block 308). The connected equipment may, for example, comprise a musical instrument (or device to control a musical instrument), a video game console, a video asset management system, or other equipment.

EXAMPLES

A reasonable encoding capacity for a QR code is 2,148 bytes of data. At one optically encoded image per frame, a frame rate of 30 fps yields a data transfer rate of 64,440 bytes per second. A YouTube quality video has a resolution of 1280×720 (with a 4K option). A reasonably robust level of magnification for a QR code is 600×600 pixels, meaning up to 2 QR codes can reliably occupy a single frame. Thus, a practical data transfer rate using standard YouTube as a distribution channel is up to 128,880 bytes per second. With a different distribution channel, greater data rates are possible. Up to 18 optically encoded images may be placed in a single frame of 4K video, yielding 38,664 bytes/frame, or a transfer rate of ~1.1 megabytes per second. Of course, those of skill in the art can select different optical encoding schemes, and error protection encoding levels, for various video capacity and transfer rates, and tune the parameters of implementations of the present invention as required, given the teachings of the present disclosure.

Three specific examples of real-world applications of the present invention were discussed above: transferring MIDI data to play a musical instrument, embedding games in a movie trailer, and providing an asset management system with movie metadata. Numerous other applications exist, and a brief discussion of a few will assist those of skill in the art to appreciate both the unique nature and the potential benefits of embodiments of the present invention.

In one embodiment, relevant statistics or other data may be transmitted in-band in the video of sporting events, races, tournaments, and the like, as the video is being produced and distributed. The on-site production of sports video is an advanced and sophisticated operation. The ability to transmit relatively voluminous data would augment the audience experience. Player information, individual or team statistics, the "playoff picture," and the like can be encoded into optically encoded images, and the images embedded into the outgoing video. Appropriately equipped video receiving apparatuses 100 may display the information in a manner similar to closed captioning, or may offer the user the option of accessing more sophisticated graphics or more voluminous textual information. Video receivers that lack the optically encoded image detection and extraction (and suppression) capability may display the optically encoded images, but at a frame rate of 30 fps, a single frame is barely noticeable, and hence a minor distraction at most.

In one embodiment documents, image files, and the like related to a video sequence are encoded into optically encoded images and transmitted along with the video. For example, class notes, reference material, or the like may be included in a video sequence of a professor delivering a class lecture. Similarly, plans, charts, drawings, text documents, or other material may be encoded into optically encoded images and transmitted along with video in a teleconference application. As the video is displayed at the receiving end, an "attachments tray," e.g., along the bottom, is displayed, with icons, thumbnail images, or the like, representing the various files transmitted as optically encoded images. A user may click on an icon or thumbnail to preview the contents, and/or may double-click the icon or thumbnail to "launch" the file-which may comprise displaying data from a file in a text or image viewing application. As described above, the optically encoded images may be embedded in the video in various locations. For example, data representing notes accompanying a class lecture may be encoded into optically encoded images that are transmitted at the beginning of the video sequence, to provide the viewer with the material, to which he or she may refer as the lecture proceeds (i.e., as the video sequence plays). On the other hand, data representing a quiz or test over the material covered in the video lecture may be encoded into optically encoded images that are embedded in video frames at the end of the video sequence. In other embodiments, data encoded into optically encoded images may be inserted into the video sequence at various locations, corresponding to the relevant portion of the video sequence. The icons or thumbnail images in the attachments tray may appear and disappear (if not selected by a user) as their relevance waxes and wanes with respect to the flow of video content.

In one embodiment a video sequence comprises exclusively optically encoded images. That is, data may be transferred from a source to one or more destinations using video as a channel, without any conventional video content (i.e., still or moving images and audio) included in the video sequence. In this embodiment, existing video distribution infrastructure may be utilized as a generic data distribution system. For example, YouTube may be used as a file server. In one embodiment, data are segmented, optically encoded, embedded in video images, and the video uploaded to a video distribution system. In another embodiment, the functionality may be incorporated into the video distribution system. In this embodiment, a user may select "data" rather than "video," upload the data file, and a preprocessing application of the video distribution system performs the data segmentation, optical encoding, and creation of a video sequence, prior to then passing the video on for distribution. This process of transferring data as in-band video via optically encoded images is very robust against errors, and is agnostic as to data type. Because the data in all optically encoded, the only relevant technical transmission factor is the type or format of the video sequence. However, a vast, interconnected, infrastructure exists for the transmission of video, and transcoding or format changes that may be necessary at some points all preserve images, and hence do not affect the optically encoded data.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An apparatus for controlling equipment, comprising:
   a video receiver configured to non-optically receive a video sequence without the use of a camera or optical scanner;
   an optically encoded image decoder configured to,
      detect one or more images of optically encoded data in an image portion of one or more video frames; and
      decode each detected image of optically encoded data to extract the data;
   whereby the apparatus is configured to control equipment, other than a display, connected to the apparatus based on the extracted data.

2. The apparatus of claim 1 wherein the receiver is configured to receive a digital representation of the video sequence via a wired or wireless data connection.

3. The apparatus of claim 1 wherein the receiver is configured to receive an analog representation of the video sequence, and further comprising:
   a digital video encoder configured to convert the analog representation of the video sequence to a digital representation of the video sequence.

4. The apparatus of claim 1 wherein the optically encoded image decoder is further configured to concatenate data extracted from a plurality of images of optically encoded data.

5. The apparatus of claim 1 further comprising a video player configured to render at least part of the received video sequence to a display.

6. The apparatus of claim 5 wherein the video player is configured to suppress, from the video sequence rendered to the display, frames containing an optically encoded image.

7. The apparatus of claim 6 wherein the video player is further configured to synchronize control of the connected equipment and the video sequence rendered to the display.

8. The apparatus of claim 7 wherein
   the connected equipment is, or is configured to play, a musical instrument; and
   the extracted data conforms to the Musical Instrument Digital Interface (MIDI) protocol.

9. The apparatus of claim 5 further comprising or connected to an asset management system, and wherein data extracted from the optically encoded images comprise metadata related to the video sequence in which they are transmitted, and wherein the apparatus is configured to output at least the metadata to the asset management system.

10. The apparatus of claim 1 wherein an image of optically encoded data comprises alteration of visual aspects of video content images in a plurality of video frames according to an encoded image pattern, wherein the alterations are imperceptible to a human viewing a rendering of the video on a display.

11. The apparatus of claim 1 wherein the equipment connected to the apparatus based comprises one of a game console and a computer, and wherein the optically encoded data comprises instructions for a game.

12. A method of controlling equipment, comprising:
   non-optically receiving a video sequence without the use of a camera or optical scanner;
   detecting one or more images of optically encoded data in an image portion of one or more video frames of the video sequence;
   decoding each detected image of optically encoded data to extract the data; and
   controlling equipment, other than a display, connected to the apparatus based on the extracted data.

13. The method of claim 12 wherein the video sequence is in an analog representation, and further comprising converting the analog representation of the video sequence to a digital representation of the video sequence.

14. The method of claim 12 wherein the connected equipment is, or is configured to play, a musical instrument, and wherein the extracted data conforms to the Musical Instrument Digital Interface (MIDI) protocol.

15. The method of claim 12 wherein the connected equipment comprises an asset management system, and wherein data extracted from the optically encoded images comprise metadata related to the video sequence in which they are transmitted, and further comprising outputting at least the metadata to the asset management system.

* * * * *